US008320331B2

(12) United States Patent
Vikberg et al.

(10) Patent No.: US 8,320,331 B2
(45) Date of Patent: Nov. 27, 2012

(54) METHOD AND APPARATUS FOR ESTIMATING A POSITION OF AN ACCESS POINT IN A WIRELESS COMMUNICATIONS NETWORK

(75) Inventors: Jari Vikberg, Järna (SE); Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 726 days.

(21) Appl. No.: 12/447,344

(22) PCT Filed: Oct. 27, 2006

(86) PCT No.: PCT/SE2006/050428
§ 371 (c)(1),
(2), (4) Date: Apr. 27, 2009

(87) PCT Pub. No.: WO2008/051124
PCT Pub. Date: May 2, 2008

(65) Prior Publication Data
US 2010/0067482 A1    Mar. 18, 2010

(51) Int. Cl.
*H04W 4/00* (2009.01)
(52) U.S. Cl. ....................................... 370/331
(58) Field of Classification Search .................. 370/331
See application file for complete search history.

(56) References Cited

U.S. PATENT DOCUMENTS

| | | | |
|---|---|---|---|
| 7,623,866 B1 * | 11/2009 | Spitzer ........................ | 455/442 |
| 2003/0148774 A1 | 8/2003 | Naghian et al. | |
| 2004/0204097 A1 * | 10/2004 | Scheinert et al. ............ | 455/561 |
| 2005/0070283 A1 | 3/2005 | Hashimoto et al. | |
| 2005/0113117 A1 | 5/2005 | Bolin et al. | |
| 2006/0019663 A1 * | 1/2006 | Cuffaro et al. ............... | 455/436 |
| 2006/0089964 A1 | 4/2006 | Pandey et al. | |
| 2007/0058601 A1 * | 3/2007 | Davis et al. .................. | 370/338 |
| 2008/0070565 A1 | 3/2008 | Maeda | |

FOREIGN PATENT DOCUMENTS

| | | |
|---|---|---|
| EP | 1 515 485 A2 | 3/2005 |
| JP | 2001-309421 A | 11/2001 |
| WO | WO 04/002185 A1 | 12/2003 |
| WO | WO 2005/004528 A1 | 1/2005 |
| WO | WO 2005/057975 A1 | 6/2005 |
| WO | WO 2007/002416 A1 | 1/2007 |

* cited by examiner

*Primary Examiner* — Mark Rinehart
*Assistant Examiner* — Maharishi Khirodhar (57) ABSTRACT

The present invention describes a method for estimating a position of an Access Point in a wireless communications network. The Access Point, used for connecting wireless networks to a core network, is being equipped with a User Equipment module, UE module. The UE module is used for scanning, for example upon a triggering event, a surrounding environment of the Access Point to identify neighbor Radio Base Stations. The Access Point then creates a neighbor list including information relating to neighbor Radio Base Stations. The Access Point forwards the neighbor list to the Network Control Node, wherein the Network Control Node uses the information in the neighbor list to estimate a position of the Access Point.

21 Claims, 5 Drawing Sheets

METHOD AND APPARATUS FOR ESTIMATING A POSITION OF AN ACCESS POINT IN A WIRELESS COMMUNICATIONS NETWORK

TECHNICAL FIELD

The present invention relates to a wireless communications network, and more particularly, to a method and apparatus for estimating a position of an Access Point in a wireless communications network.

BACKGROUND

The present invention relates to wireless communications networks. In such networks, a geographical area to be covered by the network is divided into cells each being controlled by a node. In existing networks the nodes are represented by Radio Base stations (RBSs), or Node-B as called in 3GPP specifications. Communications to and from a mobile terminal in a cell take place via a node over one or more frequency channels allocated to the cell. A Radio Base station (RBS) in a wideband code division multiple access network (WCDMA), is a part of a Radio Access Network (RAN).

Cells may be of different types. For example macro cells are used in a network to provide large area coverage. Micro cells are deployed in many networks to increase capacity. Within one macro cell coverage area there maybe one or more micro cells.

Hierarchical cellular communications systems employ different size cells to provide both wide-coverage, basic-service (macro cell) and high-quality, high-capacity radio coverage in smaller areas (micro cells). Micro cells are useful in specific areas. For example, micro cells may be located to serve areas of concentrated traffic within the macro cell or to provide a high data rate service. A micro cell uses a low-height antenna and a low base station transmit power which result in a small cell and a short frequency reuse distance, thereby increasing capacity. Additional benefits of a smaller cell include a longer talk-time (battery life time) for users since mobile stations will likely use a substantially lower uplink transmit power to communicate with a micro cell Radio Base station (RBS) than with a base station in a larger macro cell which is likely further away.

In a hierarchical cell structure (HCS), macro cells and micro cells typically overlap to handle different traffic patterns or radio environments. A micro cell base station may be connected to a macro cell base station via digital transmission lines, or the micro cell base station may be treated just like a macro cell and be connected directly to a base station controller node. Such control nodes are a base station controller (BSC), in the well-known global system for mobile communications (GSM) systems, or a radio network controller (RNC), in the third generation, wideband code division multiple access (WCDMA) systems. For more information concerning Macro cells and Micro cells see WO2005057975.

Mobile communications networks are growing rapidly as new cells are introduced into the networks. Currently a geographical position of a base station is manually configured in a control node. However, current way to manually configure the position doesn't work for a home RBS scenario, as end users install their own home RBSs. The end users are also capable of moving home RBSs when moving to or visiting a new location (house, city etc.), without an operator being able, or in many cases willing, to control this. This means that wherever a home RBS is installed and connects to an RNC in a new location, geographical data would need to be updated.

There are many existing systems for positioning of base stations or mobile stations. Patent document US20030148774 relates to a telecommunications system and a method for use in a telecommunications system. The telecommunications system comprises a plurality of service areas, each of the service areas being identified by a service area identifier. In accordance with the method a service area identifier is requested that associates with a mobile station. Upon receipt of the request, one service area identifier is selected from a plurality of possible service area identifiers. A predefined rule for the selection of the service area identifier is used for the selection. Location information that associates with the mobile station is then provided based on the selected service area identifier.

In patent document US2005113117, there is described a cellular communications network where additional control signals comprising virtual base station identification data are distributed in the radio system from well defined locations by e.g. transmitters. Since there is a connection between each virtual base station identification data and the location from where it is transmitted, a mobile terminal can use the information for improving its position estimation according to conventional procedures. No modifications of the mobile terminals are therefore necessary. The mobile terminal is not able to connect to the communications system using the virtual base station identification data, since this data only is intended for position estimating purposes. In such a way, the devices for providing the additional information necessary for the improved position estimation can be made very simple and inexpensive.

Other systems use global positioning system (GPS) receivers for determining positions of Radio Base stations or mobile stations. A GPS receiver has two different problems related to it. First, it adds significantly to the cost of a home RBS. Secondly, GPS normally don't work well indoors due to weak satellite signals.

SUMMARY

Thus, it is an object of the present invention to provide a new automatic mechanism for obtaining a position of an access point or a Femto RBS, small area RBS, whenever the Femto RBS is installed in a location (geographical area) or moved from that location and installed in another location. It is also an object of the present invention to provide such a mechanism in a wireless communications network, wherein the number of Access Points is rapidly increasing and wherein the Access Points are installed and moved by end users.

In a further embodiment of the present invention a method for estimating a position of an Access Point in a wireless communications network, is disclosed. The Access Point, used for connecting wireless networks to a core network, is being equipped with a User Equipment module, UE module. The UE module is used for scanning, for example upon a triggering event, a surrounding environment of the Access Point to identify neighbour Radio Base Stations. The Access Point then creates a neighbour list including information relating to neighbour Radio Base Stations. The Radio Base Stations being Macro RBSs and/or Femto RBSs. A connection is establishing between the Access Point and a Network Control Node. The Access Point forwards the neighbour list to the Network Control Node, wherein the Network Control Node uses the information in the neighbour list to estimate a position of the Access Point.

In yet another embodiment of the present invention an Access Point is described. The Access Point is used for connecting wireless networks to a core network, and wherein the Access Point is equipped with a user Equipment module, UE module. The UE module is used for scanning a surrounding environment of the Access Point to identify neighbour Radio Base Stations. The UE module then receives information from neighbour Radio Base Stations, the information is to be stored and used for estimating a position of the Access Point. A neighbour list manager in the Access Point is used for creating neighbour lists including information relating to neighbour Radio Base Stations. The Access Point further comprises connection establishing equipment used for establishing a connection between the Access Point and a Network Control Node, and for forwarding the neighbour list from the Access Point to the Network Control Node. The Network Control Node uses the information in the neighbour list to estimate a position of the Access Point.

In yet another embodiment of the present invention a network control node is described. The Network Control Node comprises connection establishing equipment used for establishing a connection between the Network Control Node and an Access Point, and for receiving a neighbour list from the Access Point. The neighbour list includes information relating to neighbour Radio Base Stations in a surrounding environment of the Access Point. The network control node further comprises a database including information relating to Radio Base stations in an area covered by the Network Control Node. Estimation equipment is used to estimate and automatically update a position of the Access Point based on information retrieved from the neighbour list and information stored in the database.

DETAILED DESCRIPTION

An investigation is performed, by the inventors, to find a possible way to provide homes or small areas with 3G coverage for a limited number of users using a small Radio Base station (RBS). This kind of small area Radio Base stations are here called Home 3G Access Points (H3GAPs) or Femto RBSs. A H3GAP is mainly targeted for private homes and small office segments and one benefit is that there is no need for alternative access technology investments or WLAN/UMA/GAN in handsets, since any existing 3G phones will work in such an environment. Examples of 3G standards are Wideband Code Division Code Multiple Access (WCDMA), CDMA2000 and Time Division—Synchronous Code Division Multiple Access (TD-SCDMA).

The invention described in this document is mostly relevant for a scenario using WCDMA, but it could also be applied in other cases. For example, a similar solution might be developed for GSM, CDMA2000 or TD-SCDMA. In the present description the WCDMA scenario is mostly used to achieve a more easy disclosure and better understanding of the present invention.

The H3GAPs provides normal WCDMA coverage for end users and is connected to a Radio Network Controller (RNC) using some kind of IP based transmission. A coverage area provided is called a Femto cell to indicate that the coverage area is relatively small compared with an area of a Macro cell. One alternative for the IP based transmission is to use Fixed Broadband access (like xDSL, Cable etc.) to connect the H3GAPs to the RNC. Another alternative would be to use Mobile Broadband access e.g. Wimax, HSDPA and Enhanced Uplink. A H3GAP is installed and managed by end users in a plug-and-play manner which creates special needs for such a system.

Figure 1:
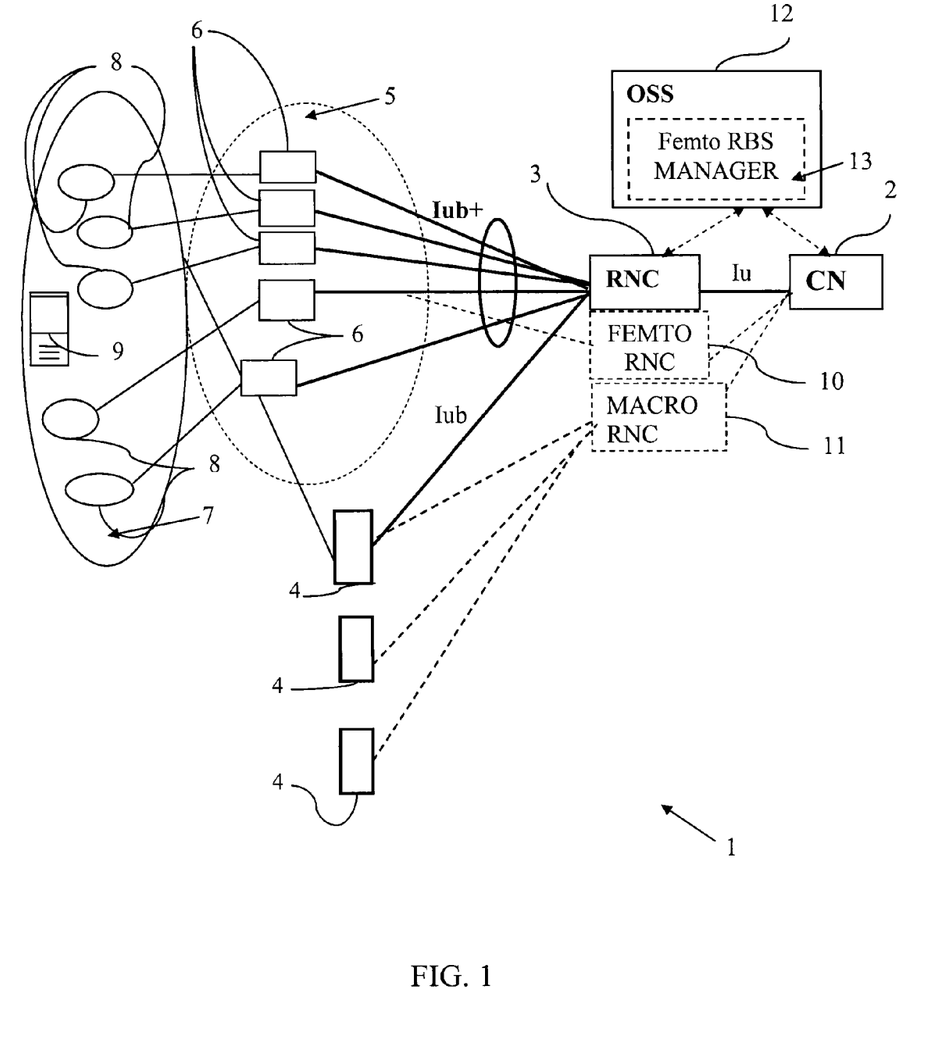
FIG. 1 is a block diagram illustrating an embodiment of the present invention.

FIG. 1 is a block diagram according to an embodiment of the invention illustrating a WCDMA network including Home 3G Access Points. The wireless communications network 1 includes a core network (CN) 2 connected to a radio network controller, RNC 3, using a standard Iu interface. Alternatively, the RNC is a Macro RNC and/or a Femto RNC. The RNC controls all Radio Base stations that are connected to the RNC, both Macro and Femto Radio Base stations. In the figure, the RNC 3 is connected to one or more Macro RBSs 4 and to one or more Femto RBSs 6 belonging to a group of Femto RBSs 5. The interface between the Femto RBS and the RNC is an Iub+ interface or an Extended Iub interface. The Iub+ interface resembles the Iub interface, but is modified for conveying additional information. Alternatively a new protocol is used to convey such additional information. The interface is transported using an IP network providing IP connectivity between a Femto RBS and the RNC. As this IP network may consists of unprotected IP networks, security mechanisms between the RNC and the Femto RBSs are included. Communication between the RNC 3 and the Macro RBSs 4 are IP based or IP/ATM based, and the interface is Iub. The Macro RBSs 4 are working as an Access Point for one or more mobiles 9 within macro cells 7. The group of Femto RBSs 5 are working as Access Points for mobiles within Femto cells 8. For simplicity only one macro cell 7 is described in FIG. 1. Also, the Macro RBSs 4 are connected to one or more RNCs 3.

In another embodiment of the present invention the CN 2 might also be connected to two RNCs, a Macro 11 and a Femto RNC 10, dashed lines in the figure. The Macro RNC 11 controls Macro Radio Base stations 4, Macro RBSs 4, and the Femto RNC 10 controls Femto RBSs 6, H3GAPs, marked with dashed lines. The Macro RNC 11 and the Femto RNC 10 would exchange information concerning Access Points 6, if necessary. An Operating Support System (OSS) 12 usually performs management of Access Points and Macro RBSs. A Femto RBS manager 13, also called H3GAP manager, is responsible for managing Femto RBSs. The OSS and the Femto RBS manager are stand alone nodes or parts of other nodes like the RNC 3 or the CN 2. The OSS and the Femto RBS manager might also be distributed programs in a network 1. The Access Point for a mobile user is a Femto RBS 6 when the mobile user is within the reach of the Femto RBS 6. When the user gets out of reach for a Femto RBS 6 then the Access Point becomes a new Femto RBS 6 or a Macro RBS 4.

Thus, the inventors realizing that there will be problems with maintaining an accurate position of an Access Point when there are a large number of Access Points, as in the new proposed H3G system, therefore they suggest the solution according to the present invention to avoid or at least alleviate such problems. An embodiment of the present invention is to make it possible to automatically estimate a position of an Access Point and maintain accurate position data. The position information is for example used in case of an emergency call.

Figure 2:
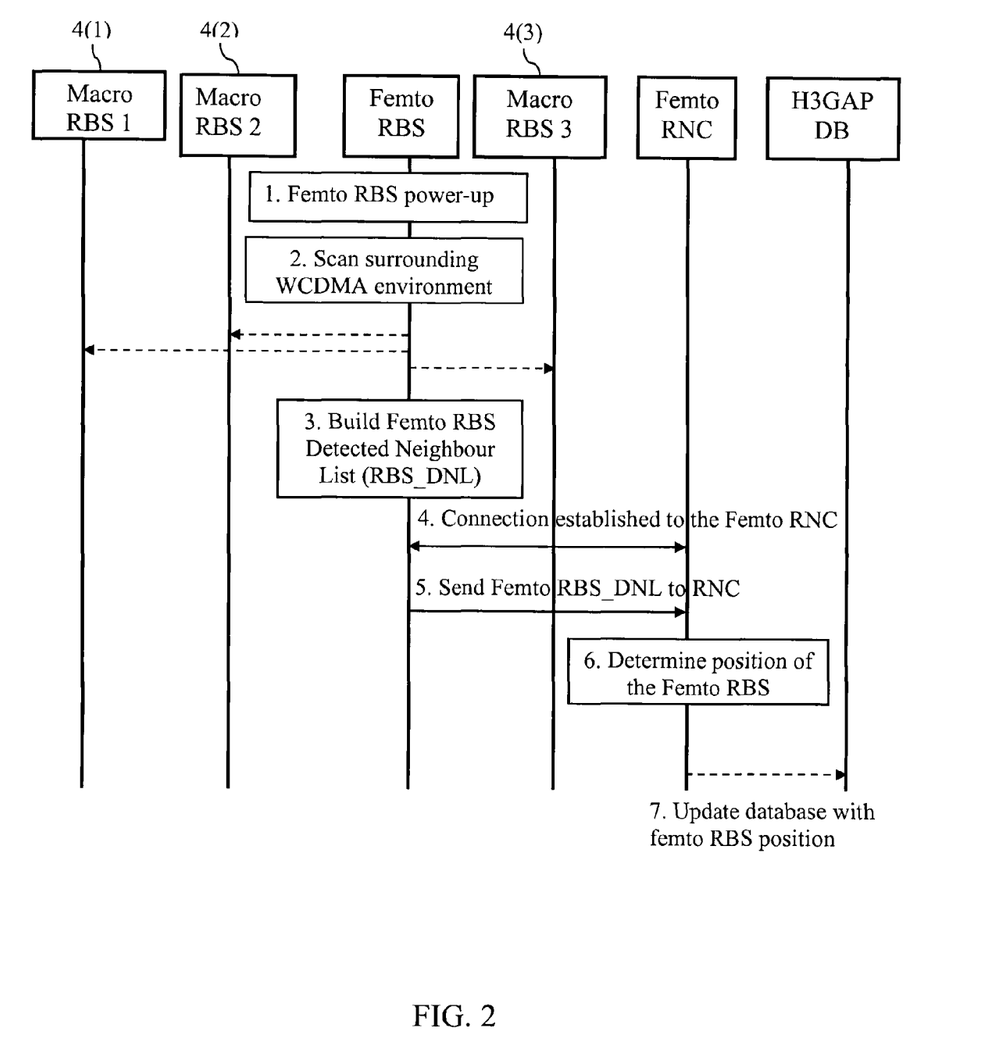
FIG. 2 is a signal diagram illustrating an embodiment of the present invention for performing position estimation.

FIG. 2 is a signal diagram illustrating an embodiment of the present invention for estimating a position of an Access Point (AP) in a wireless communications network including a large number of APs. The signal diagram illustrates the following steps:

1. A Femto RBS is initially powered up. This is the case when a Femto RBS for the first time is taken into use or the time after the Femto RBS has been moved to another location. Of course a Femto RBS can be powered off and on in the same location as previously. When powered up, the Femto RBS performs defined power up activities for this node type, which are predefined and set by a node provider. As part of the power up, the Femto RBS either dynamically builds an address identifier for a controlling Network Central Node, or the Femto RBS is already preconfigured with address information concerning a Central Node.

2. As part of the Femto RBS power-up sequence, a WCDMA user module, WCDMA UE, in the Femto RBS scans the surrounding WCDMA environment macro coverage to find out which macro WCDMA base stations or more correctly which WCDMA macro cells that exists in a current location. Information about these macro cells base stations and relevant information is retrieved. The information relates to one or more of the following: frequency, Scrambling Code, Public land mobile network identifier (PLMN-ID), Location Area Code (LAC), Routing Area Code (RAC), Cell identity (CI) and if available Reference position (latitude/longitude).

In addition or in combination the Femto RBS performs a signal strength measurement for all found cells in a similar way as a UE measures neighbouring cells in a macro WCDMA case. Also, information about transmit power used is retrieved.

Note also that in some scenarios some Femto Cells may be found during this step if the Femto RBS is not able to distinguish these cells from the macro cells.

3. All cells found in step 2 and all related information is added to a list called Femto RBS Detected Neighbour list (Femto RBS_DNL).

4. When the Femto RBS_DNL is built in the Femto RBS, the Femto RBS establishes a connection to a Femto RNC.

5. The Femto RBS_DNL is reported to the Femto RNC. If the Femto RBS_DNL contains information relating to identified Femto cells, then the Femto RNC is capable of removing these cells from the list.

6. The Femto RNC uses the received information (i.e. the Femto RBS_DNL) to determine an approximate position for the Femto RBS. Additionally, the Femto RNC uses configured geographical information for heard macro cells when determining the position of a Femto RBS.

In case the Femto RBSs and the Macro RBSs are controlled by the same RNC, the PLMN-ID, RAC, LAC and CI reported for a macro cell is to be used to find out which Macro RBS is controlling a macro cell and to find out a possibly configured geographical position for that Macro RBS.

7. The position of the Femto RBS is stored/updated in a database (RNC internal or external). In this example, the database is centralized and called Home 3G Access Database (H3GA DB).

In case the Femto RBSs 6 and Macro RBSs 4 are controlled by different RNCs, as in FIG. 1, the Femto RNC controlling the Femto RBSs does not have the geographical positions, e.g. longitude/latitude, for the Macro RBSs stored in its own data. Thus, new step 6 to step 10 are introduced as in FIG. 3. The Femto RBS will not be able to estimate a position for the Femto RBS based on the position of the Macro RBS, without the position information of the Macro RBSs.

Figure 3:
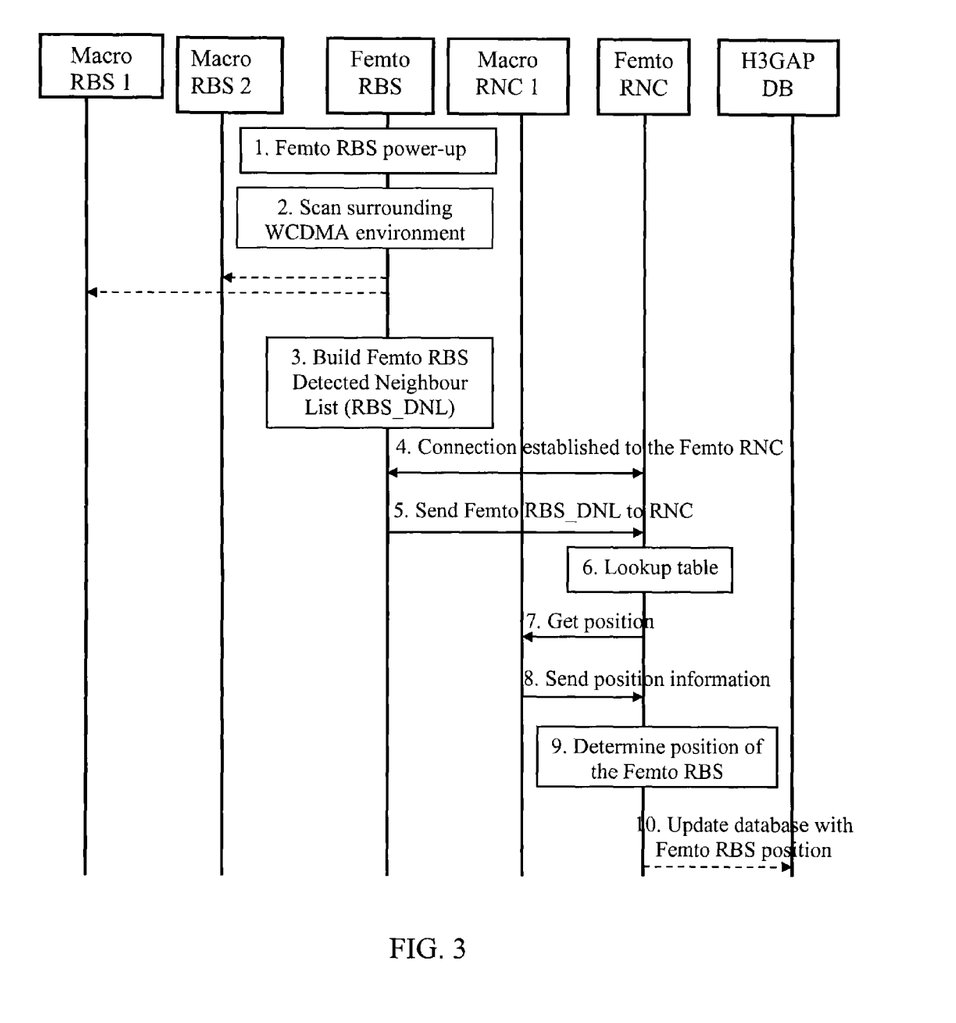
FIG. 3 is a signal diagram illustrating another embodiment of the present invention for performing position estimation.

Steps 1-5 as in the description of FIG. 2 see above.

6. The Femto RNC checks its internal database for a matching Macro RNC serving macro cells retrieved from the Femto RBS_DNL.

7. The Femto RNC requests, from the identified Macro RNC, the positions of the macro cells.

8. The Femto RNC then receives the positions of the macro cells, from the Macro RNC.

9. The Femto RNC uses the received position information, from the Macro RNC, and additional information from the Femto RBS_DNL to determine an approximate position for the Femto RBS.

10. The estimated position of the Femto RBS is stored in a database (RNC internal or external). In this example, the database is centralized and called Home 3G Access Database (H3GA DB).

In another embodiment of the present invention geographical positions of Macro RBSs are stored in a central database which is accessed by a Femto RNC (e.g. in the H3GA DB). Also in this case, the PLMN-ID, LAC and CI reported for a macro cell is to be used to point out the Macro RBS.

In yet another embodiment of the present invention transmit power and signal strength is retrieved and used to calculate an approximate distance to all heard Macro RBSs. This calculation is preferably done by the Femto RBS or the RNC and stored in the Femto RBS_DNL. The more Macro RBSs a Femto RBS can hear and detect the more accurate position estimation is performed.

Figure 4:
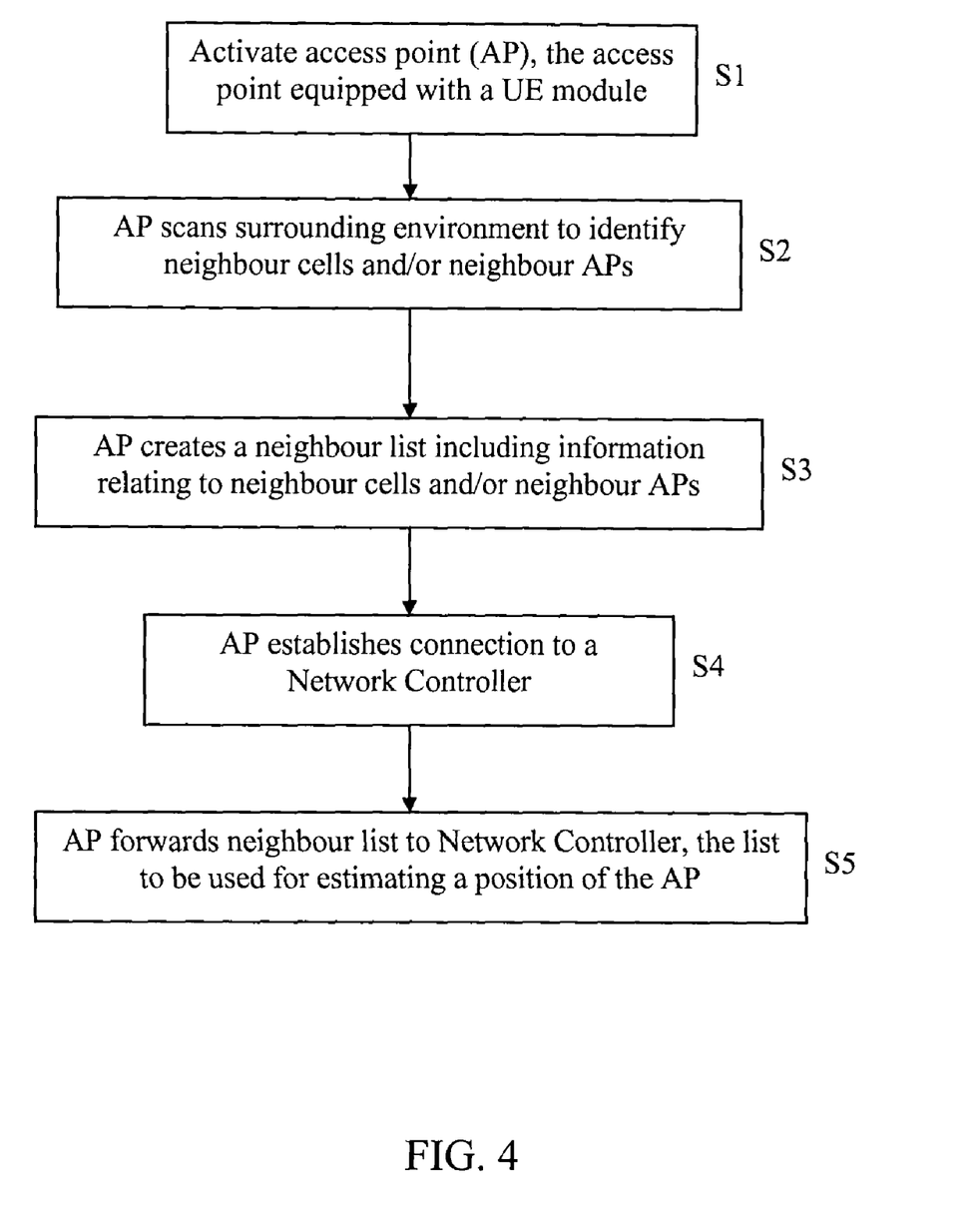
FIG. 4 is a flowchart illustrating a method according to an embodiment of the present invention.

FIG. 4 is a flowchart illustrating a method according to an embodiment of the present invention. The method is used for estimating a position of an AP in a wireless communications network. The AP according to the flowchart illustrates the following steps (S):

S1. Activating the Access Point (AP) causing a triggering event. The AP is equipped with an UE module. Activation of the AP is performed for example after that the AP is moved to a new location or when switched on for the first time. Of course the end-user is able to switch on and off the AP at any time, for example when saving power consumption etc.

S2. Scanning a surrounding environment of the AP to identify neighbour cells and/or neighbour APs. The neighbour cells are cells served by Macro RBSs S3. Creating, at the AP, a neighbour list including information relating to neighbour cells and/or neighbour APs. This information relates to one or more of the following: frequency, Scrambling Code, PLMN-ID, latitude/longitude, Location Area Code (LAC), Cell identity (CI), if available Reference position, signal strength and transmit power.

S4. Establishing a connection between the AP and a Network Control Node. The connections between the AP and the Femto RNC are IP based.

S5. Forwarding the neighbour list from the AP to the Network Control Node, wherein the Network Control Node uses the information in the neighbour list to estimate a position of the AP.

Figure 5:
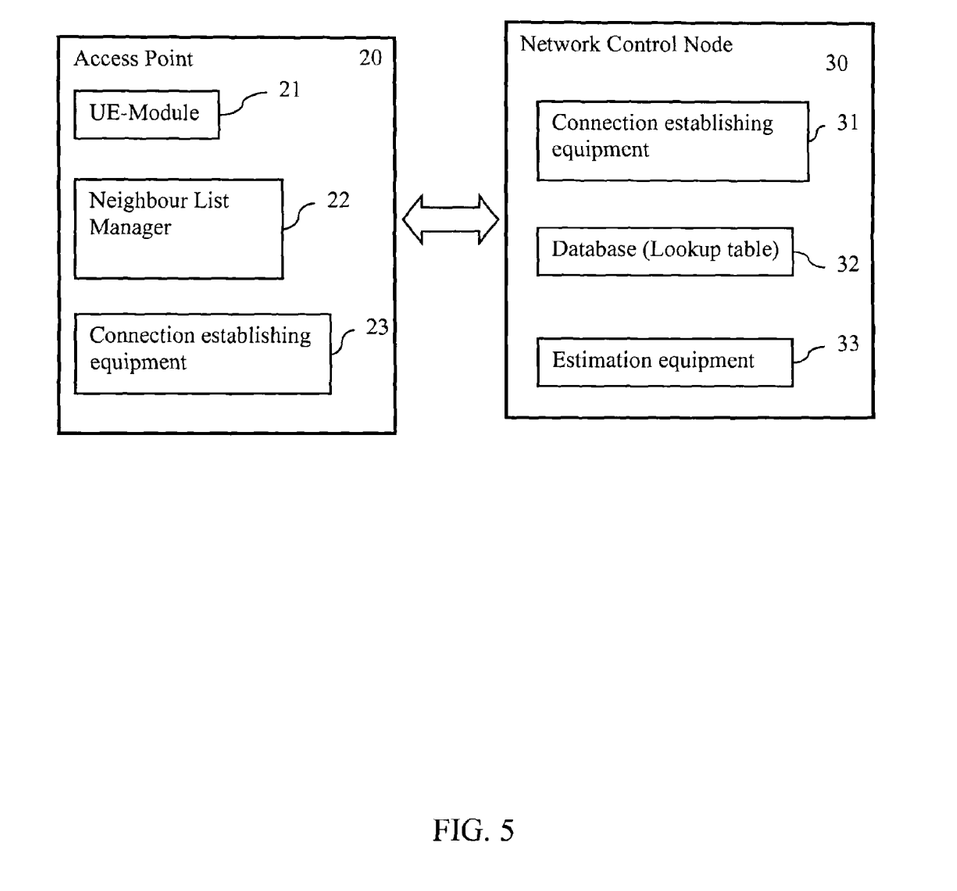
FIG. 5 is a block diagram illustrating an Access Point and a network control node according to an embodiment of the present invention.

FIG. 5 is a block diagram illustrating an Access Point and a network node in accordance to an embodiment of the present invention. In a further embodiment of the invention the wireless communication network 1 includes Access Points and Network Control Nodes communicating with each other directly or via other Network Control Nodes. FIG. 5 shows only a simplified view of the network comprising only one Access Point and one Network Control Node, i.e. RNC. In existing networks there are many Access Points controlled by one or more RNCs. The Access Point and the Network Control Node, in FIG. 5, are both simplified and contain only parts that are relevant for describing the invention.

An Access Point 20 according to FIG. 5, comprises a User Equipment Module (UE module) 21 used for scanning a surrounding of the Access Point. The UE module 21 scans and identifies cells and Access Points (4, 6) in a neighbour area serving the cells. The cells (7, 8) are areas served by Radio Base stations, Macro RBSs 4 or Femto RBSs 6. The scanning is performed automatically, periodically or event triggered by an end user. The Access Point 20 further comprises a neighbour list manager 22 used for creating and managing neighbour lists. The neighbour lists are Femto RBS Detected Neighbour Lists (Femto RBS_DNLs) including information relating to neighbour Radio Base Stations. Connection establishing equipment 23 is used for setting up a connection between the Access Point 20, i.e. Femto RBS, and a Network Control Node 30 and for forwarding Femto RBS_DNLs to the Network Control Node 30. The Network Control Node 30 includes also a connection establishing equipment 31 for connecting to the Access Point 20 and for receiving Femto RBS_DNLs. The Network Control Node 20 further includes a database 32, including Lookup tables, with macro and Femto RBS information. The database 32 includes also a lookup table with Macro RNC identities. Estimation equipment (33) in the Network Control Node 30 is used for estimating a position of an Access Point 20 based on information retrieved from the Femto RBS_DNL and the database 32. If more information is needed about positions of Macro RBSs the Network Control Node 30 checks its Lookup table to identify serving Macro RNCs which can provide such position information. The Network Control Node 30, in FIG. 5, manages one or several Access Points 5, as in FIG. 1. FIG. 5 shows only parts of the wireless communications network 1 needed to explain the present invention in a simple manner.

In another aspect of the present invention, a reference position broadcasted in system information could be used as an input for estimation of a position of an Access Point (AP). This means that instead of retrieving position information from another node, as previously described, the position information heard in the surrounding WCDMA environment is used by an AP to estimate its own position. This way position information is directly used by the Access Point and the step of retrieving position information from a control node of a Radio Base Station, an AP or a node storing position information, is no longer needed. The broadcasted reference information is for example latitude/longitude used together with other relevant data e.g. Signal strength measurements. The AP is thereby able to estimate its own position based on position information received from neighbour base stations and thereafter update the RNC with this information. Preferably, the position estimation procedure mentioned above is performed automatically upon a triggering event.

It will be understood by those skilled in the art that various modifications and changes may be made to the present invention without departure from the scope thereof which is defined by the appended claims.

The invention claimed is:

1. A method for estimating a position of a Femto Radio Base Station (Femto RBS) serving a Femto cell in a wireless communications network comprising at least one neighbouring Femto RBS and at least one neighbouring Macro Radio Base Station (Macro RBS) serving a Macro cell, wherein the Femto RBS is equipped with a User Equipment (UE) module used for connecting wireless networks to a core network, said method comprising the steps of:

using the UE module to scan a surrounding environment of the Femto RBS to identify neighbour Radio Base stations;

creating, at the Femto RBS, a neighbour list including information relating to identified neighbour Macro Radio Base stations from among all the neighbor Radio Base Stations by;

performing signal strength measurements for all detected neighbour cells including Macro cells and Femto cells; and creating a neighbor list that includes the measured information for detected Macro cells but excludes measured information for detected Femto cells;

establishing a connection between the Femto RBS and a Network Control Node; and, forwarding the neighbour list from the Femto RBS to the Network Control Node, wherein the Network Control Node uses the information in the neighbour list to estimate a position of the Femto RBS.

2. The method according to claim 1, wherein the step of creating a neighbour list comprises the step of said Femto RBS retrieving information related to neighbour cells transmit power and including retrieved information in the neighbour list.

3. The method according to claim 1, wherein the information in the neighbour list relates to one or more of the following:

cell frequency;
Scrambling codes;
Public land mobile network identifier, PLMN-ID;
location area code;
cell identity;
reference position; and,
routing area code.

4. The method of claim 1, wherein the Network Control Node determines if the neighbour list contains information relating to Femto Radio Base stations and Macro Radio Base stations, and estimates a position of the Femto RBS based solely on neighbour list Macro Radio Base station information.

5. The method of claim 1, wherein the Network Control Node includes information which is used in combination with information retrieved from the neighbour list to identify a Radio Base station's serving Radio Network Controller (RNC).

6. The method of claim 5, wherein the Network Control Node requests and receives position information relating to the Radio Base station's in the neighbour list from the Radio Base station's serving RNC.

7. The method of claim 1, wherein the Femto RBS is connected to a core network via at least one Femto Radio Network Controller, (RNC).

8. The method of claim 7, wherein the connection between the Femto RBS and a Femto RNC is an Internet Protocol (IP) based connection.

9. The method of claim 1, wherein the Femto RBS, upon power up, automatically:

scans a surrounding environment;
registers with a Network Control Node;
creates a neighbour list; and,
downloads configuration data.

10. A Femto Radio Base Station (Femto RBS) serving a Femto cell in a wireless communications network comprising at least one neighbouring Femto RBS and at least one neighbouring Macro Radio Base Station (Macro RBS) serving a Macro cell, the Femto RBS for connecting to a core network, wherein the Femto RBS comprising the following parts:

a User Equipment (UE) module for scanning a surrounding environment of the Femto RBS to identify neighbour Radio Base stations, wherein the UE module receives information from identified neighbour base stations serving neighbour cells; and, a neighbour list manager for creating a neighbour list including information relating to neighbour Macro Radio Base stations from among all the neighbor Radio Base Stations by:

performing signal strength measurements for all detected neighbour cells including Macro cells and Femto cells; and creating the neighbor list that includes the measured information for detected Macro cells but excludes measured information for detected Femto cells; and, connection establishing equipment for establishing a connection with a Network Control Node and for forwarding the neighbour list from the Femto RBS to the Network Control Node, wherein the Network Control Node uses the information in the neighbour list to estimate a position of the Femto RBS.

11. The Femto RBS of claim 10, wherein the Femto RBS, upon power up, automatically:
scans a surrounding environment;
registers with a Network Control Node;
creates a neighbour list; and,
downloads configuration data.

12. The Femto RBS of claim 10, wherein the information in the neighbour list relates to one or more of the following:
cell frequency;
Scrambling codes;
Public land mobile network identifier, PLMN-ID;
location area code;
cell identity;
reference position;
routing area code;
neighbour cells transmit power; and,
measured signal strength for all detected neighbour cells.

13. A Network Control Node in a wireless communications network comprising a Femto Radio Base Station (Femto RBS) serving a Femto cell, at least one neighbouring Femto RBS, and at least one neighbouring Macro Radio Base Station (Macro RBS) serving a Macro cell, comprising the following parts:

connection establishing equipment used for establishing a connection between the Network Control Node and the Femto RBS and for receiving a neighbour list from the Femto RBS, the neighbour list including information relating to neighbour Radio Base stations in a surrounding environment of the Femto RBS, where the Femto RBS created the neighbour list from signal strength measurements for detected Macro cells but excluded signal strength measurements for detected Femto cells; and, a database including information relating to Radio Base stations in an area covered by the Network Control Node; and, estimation equipment used to determine if the neighbour list contains information relating to Femto Radio Base stations and Macro Radio Base stations and then estimates a position of the Femto RBS based solely on neighbour list Macro Radio Base station information and on information in the database.

14. The Network Control Node of claim 13, wherein the Network Control Node database includes information which is used in combination with information retrieved from the neighbour list to identify a Radio Base stations's serving Radio Network Controller (RNC).

15. The Network Control Node of claim 14, wherein the Network Control Node requests and receives position information, relating to the Radio Base stations in the neighbour list from the Radio Base stations's serving RNC.

16. The Network Control Node of claim 13, wherein the Network Control Node is a Femto Radio Network Controller (RNC) or part of a Femto RNC.

17. The Network Control Node of claim 13, wherein the Network Control Node automatically updates the Femto RBS estimated position and stores estimated positions of Femto RBSs in the Database.

18. The Network Control Node of claim 13, wherein upon demand position information of a Femto RBS, which is stored and automatically updated in the Network Control Node, is retrieved in case of an alarm signal.

19. A Femto Radio Base Station (Femto RBS) serving a Femto cell in a wireless communications network comprising at least one neighbouring Femto RBS and at least one neighbouring Macro Radio Base Station (Macro RBS) serving a Macro cell, wherein the Femto RBS comprising the following parts:

a User Equipment (UE) module for scanning a surrounding environment of the Femto RBS to identify neighbour Radio Base stations, wherein the UE module receives information from identified neighbour base stations serving neighbour cells; and, a neighbour list manager for creating neighbour lists including information relating to neighbour Macro Radio Base stations from among all the neighbor Radio Base Stations;

connection establishing equipment for establishing a connection with a Network Control Node and for forwarding the neighbour list from the Femto RBS to the Network Control Node, wherein the Network Control Node uses the information in the neighbour list to estimate a position of the Femto RBS; and, wherein the neighbour list manager creates the neighbour list after the UE module performs signal strength measurements for all detected neighbour cells including Macro cells and Femto cells and including measured information for the detected Macro cells and the detected Femto cells in the neighbour list if the neighbour list manager is not able to distinguish Femto cells from Macro cells, and if the neighbour list manager is able to distinguish Femto cells from Macro cells then creating the neighbour list including measured information for the detected Macro cells and not the detected Femto cells.

20. A method for estimating a position of a Femto Radio Base Station (Femto RBS) serving a Femto cell in a wireless communications network comprising at least one neighbouring Femto RBS and at least one neighbouring Macro Radio Base Station (Macro RBS) serving a Macro cell, wherein the Femto RBS is equipped with a User Equipment (UE) module used for connecting wireless networks to a core network, said method comprising the steps of:

using the UE module to scan a surrounding environment of the Femto RBS to identify neighbour Radio Base stations;

creating, at the Femto RBS, a neighbour list including information relating to identified neighbour Macro Radio Base stations from among all the neighbor Radio Base Stations by;

performing signal strength measurements for all detected neighbour cells including Macro cells and Femto cells; and creating a neighbor list that includes the measured information for detected Macro cells but excludes measured information for detected Femto cells;

establishing a connection between the Femto RBS and a Network Control Node;

forwarding the neighbour list from the Femto RBS to the Network Control Node, wherein the Network Control Node uses the information in the neighbour list to estimate a position of the Femto RBS; and the Network Control Node determines if the neighbour list contains information relating to Femto Radio Base stations and Macro Radio Base stations, and estimates a position of the Femto RBS based solely on neighbour list Macro Radio Base station information.

21. A Network Control Node in a wireless communications network comprising a Femto Radio Base Station (Femto RBS) serving a Femto cell, at least one neighbouring Femto RBS, and at least one neighbouring Macro Radio Base Station (Macro RBS) serving a Macro cell, comprising the following parts:

connection establishing equipment used for establishing a connection between the Network Control Node and the Femto RBS and for receiving a neighbour list from the Femto RBS, the neighbour list including information relating to neighbour Radio Base stations in a surrounding environment of the Femto RBS; and, a database including information relating to Radio Base stations in an area covered by the Network Control Node;

estimation equipment used to determine if the neighbour list contains information relating to Femto Radio Base stations and Macro Radio Base stations and then estimates a position of the Femto RBS based solely on neighbour list Macro Radio Base station information and on information in the database;

the Network Control Node database includes information which is used in combination with information retrieved from the neighbour list to identify a Radio Base stations's serving Radio Network Controller (RNC); and the Network Control Node requests and receives position information, relating to the Radio Base stations in the neighbour list from the Radio Base stations's serving RNC.

* * * * *